US012042869B2

(12) United States Patent
Dopler et al.

(10) Patent No.: US 12,042,869 B2
(45) Date of Patent: Jul. 23, 2024

(54) METHOD AND DEVICE FOR PRODUCING MATERIAL POWDER

(71) Applicant: Metalpine GmbH, Graz (AT)

(72) Inventors: Martin Dopler, Graz (AT); Christian Weiss, Trofaiach (AT)

(73) Assignee: METALPINE GMBH, Graz (AT)

( * ) Notice: Subject to any disclaimer, the term of this patent is extended or adjusted under 35 U.S.C. 154(b) by 77 days.

(21) Appl. No.: 17/595,739

(22) PCT Filed: May 25, 2020

(86) PCT No.: PCT/EP2020/064388
§ 371 (c)(1),
(2) Date: Nov. 23, 2021

(87) PCT Pub. No.: WO2020/244948
PCT Pub. Date: Dec. 10, 2020

(65) Prior Publication Data
US 2022/0219235 A1    Jul. 14, 2022

(30) Foreign Application Priority Data

Jun. 5, 2019 (EP) ...................................... 19178464

(51) Int. Cl.
*B22F 9/08* (2006.01)
*B22F 1/052* (2022.01)

(52) U.S. Cl.
CPC .............. *B22F 9/082* (2013.01); *B22F 1/052* (2022.01); *B22F 2009/0824* (2013.01);
(Continued)

(58) Field of Classification Search
CPC .. B22F 9/082; B22F 1/052; B22F 2009/0824; B22F 2009/0832; B22F 2009/086; B22F 2009/0888
See application file for complete search history.

(56) References Cited

U.S. PATENT DOCUMENTS 3,195,241 A * 7/1965 Hohne ...................... B04C 5/14
159/4.06
3,501,802 A * 3/1970 Lecznar ................... B22F 9/082
425/7
(Continued)

FOREIGN PATENT DOCUMENTS

EP 3459658 A1 3/2019
FR 3051699 A1 12/2017
(Continued)

OTHER PUBLICATIONS

International Search Report, English translation, from PCT/EP2020/064388 filed May 25, 2020, mailed Aug. 20, 2020.

*Primary Examiner* — Brian D Walck
*Assistant Examiner* — Nazmun Nahar Shams
(74) *Attorney, Agent, or Firm* — Workman Nydegger (57) ABSTRACT

A method for producing material powder, comprising providing material and an atomization gas charged with an atomization gas pressure by means of an atomization gas compressor to an atomization device, melting the material and pulverizing the molten material into material powder by means of charging the molten material with the atomization gas using the atomization device, introducing the material powder from the atomization device into a pressurized container and providing a conveyor gas charged with a conveyer gas pressure by means of a conveyer gas compressor to the pressurized container, wherein the conveyor gas pressure is higher than the atmospheric pressure and lower than the atomization gas pressure, as well as a device for carrying out the method.

7 Claims, 3 Drawing Sheets

(52) U.S. Cl.
CPC . *B22F 2009/0832* (2013.01); *B22F 2009/084* (2013.01); *B22F 2009/086* (2013.01); *B22F 2009/0888* (2013.01); *B22F 2201/02* (2013.01); *B22F 2201/30* (2013.01); *B22F 2202/13* (2013.01)

(56) References Cited

U.S. PATENT DOCUMENTS

| | | | | |
|---|---|---|---|---|
| 4,078,873 | A | * | 3/1978 | Holiday .................... B22F 9/10 425/8 |
| 6,405,512 | B1 | * | 6/2002 | Tornberg ................ B22F 9/082 53/235 |
| 6,444,009 | B1 | | 9/2002 | Liu et al. |
| 6,565,010 | B2 | * | 5/2003 | Anderson ............... B05B 7/066 239/422 |

FOREIGN PATENT DOCUMENTS

| | | |
|---|---|---|
| WO | 9741986 A1 | 11/1997 |
| WO | 2018035202 A1 | 2/2018 |

\* cited by examiner

METHOD AND DEVICE FOR PRODUCING MATERIAL POWDER

The invention relates to a method for producing material powder according to the preamble of claim 1.

The invention further relates to a device for producing material powder.

Producing material powder from molten mass by using atomization gases has been known in prior art and is being realized on an industrial scale. There are existent a number of different methods for producing material powder, which may be classified into externally mixing and internally mixing methods. In both types of methods a stream of molten material is charged with an atomization gas, which atomizes the molten material into fine particles. These fine particles then produce the material powder. Powder processing methods, which have been developed lately, such as, e.g., 3D pressure in the powder bed method, require, however, strongly increased requirements in regard to quality for the material powders in terms of their particle size, particle size distribution, product purity as well as particle shape. In particular fine material powders or also powder materials having a narrow particle size distribution, material powders that are poor in oxygen, nitrogen or hydrogen or material powders having little moisture at the powder surface, no impurities due to contamination by way of foreign powders or crucible material as well as spherical material powders that are poor in satellites and have good flow characteristics are of advantage. Material powders, which have been produced using methods known from prior art, however, do not provide those quality features required by novel powder processing methods. In this way, it is necessary that material powders produced using known methods are subjected to complex quality analyses and sieving or inspection methods in order for the final product to provide the required product characteristics. This will lead, however, to a large portion of the produced material powder being discharged, the production costs being increased, the energy consumption per amount of high-quality material powder produced being increased and the yield being reduced. These disadvantageous characteristics of common methods for producing material powder will result, as a consequence, in a high price and in a low product availability on the market for the final consumer.

A method and a device for producing material powder according to prior art are disclosed in the U.S. Pat. No. 4,534,917. This method for producing material powder comprises providing material to an atomization device, which will melt this. The molten material is then charged with an atomization gas in the atomization device and thereby atomized. Thereby, the molten material and the atomization gas are guided through a nozzle, which is part of the atomization device. The material powder thus produced is then blown into a collecting vessel.

The document EP 3 459 658 A1 discloses a method for producing material powder, wherein the surface of the produced material powder is passivated by means of an oxygen containing gas.

The document WO 2018/035202 A1 discloses a device for producing material powder using a blower assembly.

The document WO 97/41986 A1 discloses a method for producing metal powder in an atomization system, comprising a reaction pan, a casting mould, a powder container and a sedimentation equipment.

The document U.S. Pat. No. 6,444,009 B1 discloses a two-stage method for producing ultra-fine and environmentally stable powder from a metal composition using a reactive alloy treatment.

It is the task of the present invention to provide a method and a device for producing material powder, which overcome the disadvantages of prior art.

According to the invention the present task is solved by a method having the features of claim 1.

The method according to the invention for producing material powder comprises providing material to an atomization device. Furthermore, there is provided an atomization gas charged with an atomization gas pressure by means of an atomization gas compressor to the atomization device. The material is molten using the atomization device, and the molten material is atomized to material powder by the molten material being charged with the atomization gas, preferably in a pressurized atomization container of the atomization device, by means of the atomization device. In succession, the material powder is introduced by the atomization device into a pressurized container, in which the material powder is cooled and collected. The pressurized container may, for example, be connected to the atomization device, or the atomization device may be integrated in the pressurized container. The method according to the invention further comprises the provision of a conveyer gas charged with a conveyor gas pressure to the pressurized container, wherein the conveyor gas is charged with the conveyor gas pressure by means of a conveyor gas compressor. The conveyor gas pressure is thereby selected such that the conveyor gas pressure is higher than the atmospheric pressure and lower than the atomization gas pressure.

All prior art methods have in common that there are not taken any further measures for the targeted control of the thermo-dynamic condition of the atomization gas at the contact point with the surface of the molten material during atomization beyond those influencing temperature. The invention, hence, is based on the key consideration that within the atomization zone, apart from a suitable gas flow guide, the thermo-dynamic condition point of the atomization gas at the surface of the molten material is essential for the atomization result. The gas condition point may be controlled via the temperature and in particular the pressure or resting pressure, respectively, i.e. the positive static pressure, within the atomization container, resulting in a particular achievable gas density or resting gas density, respectively, of the gas. Due to the higher pulse transfer between gas flow and molten mass in the atomization zone, a higher gas density will provide better atomization results. In this context, in the course of the invention there has been attained the knowledge that the gas density in the atomization zone may be controlled most effectively by the pressure downstream of the nozzle of the atomization device and not, as known from prior art, by the atomization pressure of the gas upstream of the nozzle of the atomization device.

Due to the embodiment according to the invention of the method for producing material powder, there is provided, in addition to the atomization gas having the atomization gas pressure, a conveyor gas having the conveyor gas pressure to the pressurized container. This conveyor gas pressure is higher than the atmospheric pressure and lower than the atomization gas pressure. In this way, there is provided the possibility to adjust the gas density, in particular at the atomization point, and to obtain a higher pulse transfer between the molten material and the gas surrounding the molten material or flowing through it, respectively. In this way, there is achieved, in comparison to prior art, a finer atomization result, i.e. the particle size of the material powder produced using the inventive method is reduced. Furthermore, the method according to the invention provides for a material powder having a smaller range of particle size distribution. In addition, the method according to the invention enables a variation of the particle size by means of a variation of the conveyor gas pressure and the atomization gas pressure, independently of the production quantity. Furthermore, the method may be realized in a device according to the invention that is inexpensive to be produced. The conveyor gas, furthermore, in particular has the tasks to prevent recirculation of the gas flows and, hence, powder agglomerations, near the nozzle as well as to obtain cooling of the produced material powder, whereby there may be omitted a separate external cooling. This cooling effect may also be influenced via the pressure of the conveyor gas. The higher the conveyor gas pressure selected, the better the cooling effect of the conveyor gas.

According to the preferred embodiment of the method according to the invention the conveyor gas is returned from the pressurized container to the conveyor gas compressor, whereby the method is realized as a cycle process, with the conveyor gas not being lost. In this way, there is obtained the advantage that the method according to the invention has low energy requirements and, hence, low operational costs. In particular when using expensive conveyor gases such as $CO_2$, nitrogen, helium or argon, or also gas mixtures, there is obtained the advantage that the conveyor gas is not lost and may be re-used in the cycle process. This will lead to a further reduction of the operational costs, a high product purity as well as reduced dust emissions.

A portion of the conveyor gas having the conveyor gas pressure is preferably deviated before the provision thereof to the pressurized container and then compressed by means of the atomization gas compressor into the atomization gas having the atomization gas pressure that is higher than the conveyor gas pressure. In this way, there is obtained the advantage that the atomization gas need not be provided separately, but is rather produced from the conveyor gas flow. This will lead to a further reduction of the operational costs and to an integration of the atomization gas into the cycle process.

The method according to the invention comprises furthermore conveying the material powder from the pressurized container into a separation device using the conveyor gas and then subsequently separating the material powder into material powder having a first particle size range and material powder having a second particle size range using the separation device. Thereafter, the material powder having the first particle size range is removed from the separation device. In this way, there is obtained the advantage that the material powder having a still narrower particle size range may be produced using the method according to the invention.

The method according to the invention comprises preferably conveying the material powder having the second particle size range out of the separation device into at least one further separation device using the conveyor gas. In this at least one further separation device separating the material powder having the second particle size range into material powder having at least two further particle size ranges is realized using the at least one further separation device. Subsequently, the material powder having at least one of the at least two further particle size ranges is removed from the conveyor gas. In this way, there is obtained the advantage that the material powder may be separated into further particle size ranges.

The method according to the invention comprises in the preferred embodiment heating the atomization gas using an atomization gas heat exchanger. In this way, there is obtained the advantage that there may be obtained an improved atomization by means of the heated atomization gas.

The method according to the invention may furthermore comprise cooling the conveyor gas using a first conveyor gas heat exchanger. By cooling the conveyor gas, there may be prevented an overheating of the device according to the invention performing the method according to the invention.

The method according to the invention for producing material powder comprises a conveyor gas compressor, an atomization gas compressor, an atomization device and a pressurized container, and it is configured to carry out the method according to the invention. The device according to the invention further comprises preferably at least one separation device. According to the preferred embodiment of the device according to the invention the device may further have a cooling device, an atomization gas heat exchanger, a first conveyor gas heat exchanger and/or a second conveyor gas heat exchanger.

The device for producing material powder comprises according to the invention the conveyor gas compressor, the atomization gas compressor, the atomization device and the pressurized container. The atomization gas compressor is configured to provide an atomization gas charged with an atomization gas pressure to the atomization device, and the atomization device is configured to melt a material and to charge the molten material with the atomization gas, to atomize the material powder and to introduce the material powder into the pressurized container. The device furthermore is configured to provide a conveyor gas charged by means of the conveyor gas compressor with a conveyor gas pressure that is higher than the atmospheric pressure and lower than the atomization gas pressure to the pressurized container.

The device is preferably configured to return the conveyor gas from the pressurized container to the conveyor gas compressor.

Furthermore, the device is preferably configured to deviate a portion of the conveyor gas having the conveyor gas pressure before the provision thereof to the pressurized container. The atomization gas compressor is preferably configured to compress the deviated portion of the conveyor gas into the atomization gas having the atomization gas pressure that is higher than the conveyor gas pressure.

The device has according to the invention at least one separation device and it is configured to convey the material powder with the conveyor gas out of the pressurized container and into the separation device. The separation device is configured according to this embodiment to separate the material powder into material powder having a first particle size range and material powder having a second particle size range, wherein the device is configured to remove the material powder having the first particle size range from the conveyor gas.

The device is furthermore configured to convey the material powder having the second particle size range out of the separation device into at least one further separation device by means of the conveyor gas, and the at least one further separation device is configured to separate the material powder having the second particle size range into material powder having at least two further particle size ranges. The device is also configured to remove the material powder having at least one of the at least two further particle size ranges from the conveyor gas.

According to an embodiment variant of the device according to the invention the device comprises an atomization gas heat exchanger, which is configured to heat the atomization gas.

In addition, the device preferably comprises a second conveyor gas heat exchanger, which is configured to cool the conveyor gas.

Advantageous embodiments of the method according to the invention and the device according to the invention are explained in greater detail in the following by way of the figures.

Figure 1:
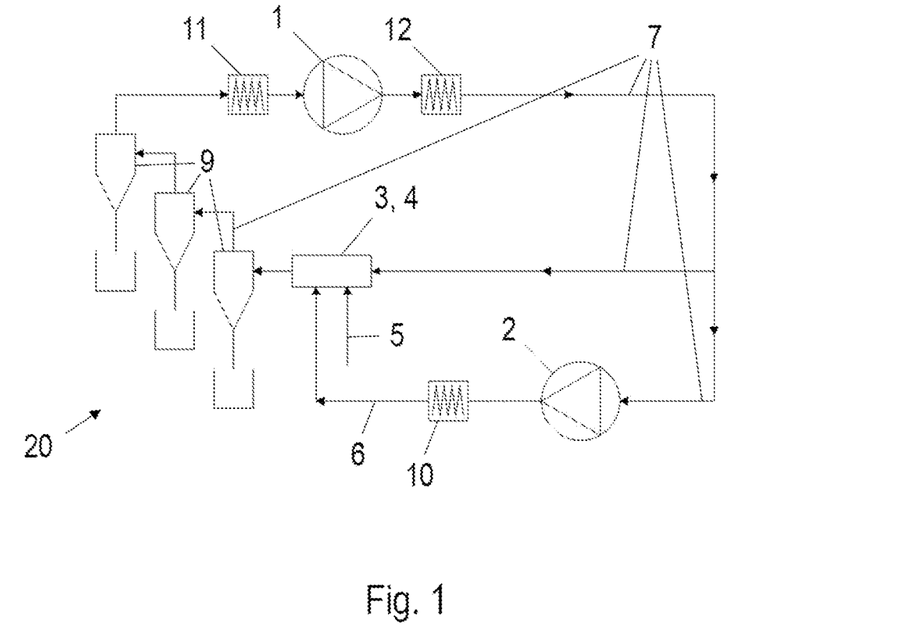
FIG. 1 shows a process scheme of the method according to the invention and a schematic depiction of the set-up of the device according to the invention, respectively.

FIG. 1 shows a process scheme of the method according to the invention and a schematic depiction of the device 20 according to the invention having a conveyor gas compressor 1, an atomization gas compressor 2, an atomization device 3 and a pressurized container 4, respectively, wherein the pressurized container 4 and the atomization device 3 in the process scheme are depicted as a common unit 3 and 4. In the method according to the invention for producing material powder a material 5 and an atomization gas 6 charged with an atomization gas pressure by means of the atomization gas compressor 2 are provided to the atomization device 3. Various atomization devices 3, which have been known from prior art, may be used within the frame of the method according to the invention. There are to be mentioned as examples open (free) jet-, confined (or closed couple)-, close coupled atomization-, plasma atomization and in general internally mixing and externally mixing atomization devices 3. In the atomization device 3 the material 5 is molten and atomized into material powder by the molten material 5 being charged with the atomization gas 6 using the atomization device 3. The material powder is not depicted in the schematic view of FIG. 1. Subsequently, the material powder is introduced by the atomization device 3 into the pressurized container 4, which is depicted in FIG. 1 in an entity 3 and 4 with the atomization device 3. According to the invention, a conveyor gas 7 charged with a conveyor gas pressure using the conveyor gas compressor is provided to the pressurized container 4. In this way, in addition the conveyor gas 7 is introduced into the pressurized container 4 in a gas stream of its own, as depicted in detail in FIG. 2a and FIG. 2b. This conveyor gas pressure in this regard is higher than the atmospheric pressure and lower than the atomization gas pressure. In the pressurized container 4 there is then developed an equilibrium pressure. In this way, there is given the possibility to adjust the gas density in particular at the atomization point and to obtain a higher pulse transfer between the molten material 5 and the gas surrounding the molten material 5 and flowing through it, as is possible in a method known from prior art. In this way, there is obtained a better atomization result in comparison to prior art, and the particle fineness of the material powder produced by means of the method according to the invention is improved. Due to the conveyor gas pressure that is increased compared to the atmospheric pressure there is in addition obtained the advantage that no undesired ambient air may contaminate the material powder in the method according to the invention. In this way, the purity of the material powder produced is increased, as undesired reactions with oxygen, nitrogen or hydrogen are avoided. Furthermore, there is provided an improved cooling effect by the conveyor gas pressure. Flow rate and particle sizes may also be controlled by means of the conveyor gas pressure. By charging the conveyor gas 7 with pressure and, hence, also one of the outlet openings 8 depicted in the FIGS. 2a and 2b of the atomization device 3 in opposition to the flow direction of the exiting stream of molten material 5 the purity of the material powder as well as the production rate may be separately adjusted. The higher the gas pressure at the outlet opening of the atomization device 3 in comparison to the pressure of the molten material 5, the lower the production rate. The higher the gas flow rate in comparison to the flow rate of the molten material 5, the finer the material powder produced. This results in the possibility of an independent adjustment of powder fineness and production rate. Via the conveyor gas pressure, the fineness of the produced particles of the material powder may be adjusted. A flow rate of the molten material may be adjusted by a pressure, which acts on the molten material 5. By atomization of the molten material 5 in the pressurized container 4 charged with the conveyor gas, there is provided an option for adjusting the fineness of the material powder.

The method according to the invention is suited for producing material powder from various materials 5. To be mentioned as examples are metals like iron, copper and titanium, metal alloys, molten mineral masses and slags, waxes, polymers, plastics and plastic blends. In the case of the production of material powders from waxes it is advantageous to use nitrogen or argon as atomization gas 6 and/or conveyor gas 7 in the method according to the invention. In the case of the production of materials powders from polymers it is advantageous to use $CO_2$ as atomization gas 6 and/or conveyor gas 7 in the method according to the invention. Further suitable combinations of various material powders with various gases or gas mixtures, respectively, are known to those skilled in the art.

As depicted in FIG. 1, in this method the gas is guided according to the invention in part or also completely in a cycle. According to the preferred embodiment of the method according to the invention the conveyor gas 7 is returned from the pressurized container 4 to the conveyor gas compressor 1. In this way, there is obtained the advantage that the conveyor gas 7 is not lost but is rather reused in the method according to the invention. This is in particular advantageous when using expensive conveyor gases 7 such as, for example, noble gases.

According to the preferred embodiment of the method according to the invention a portion of the conveyor gas 7 is deviated using the conveyor gas pressure, as depicted in FIG. 2, before the provision thereof to the pressurized container 4. This deviated conveyor gas 7 is compressed into the atomization gas 6 by means of the atomization gas compressor 2 to the atomization gas pressure. The atomization gas pressure is higher than the conveyor gas pressure. The atomization gas 6 is then provided to the atomization device 3. In this way, there is obtained the advantage that the same gas is used as atomization gas 6 and as conveyor gas 7. In this way, the method according to the invention is simplified and may be realized more cost-effectively.

Subsequently to the atomization of the molten material 5 using the atomization device 3 into the material powder and to the introduction of the material powder into the pressurized container 4, the material powder is conveyed preferably out of the pressurized container 4 by means of the conveyor gas 7 into a separation device 9. The separation device 9 separates the material powder into material powder having a first particle size range and material powder having a second particle size range. Subsequently, the material powder having the first particle size range is removed from the conveyor gas 7. The separation device 9 may, for example, be configured as a cyclone separator. Alternatively, the separation device 9 may also be configured as filter, magnetic or electrostatic separation device 9. Further embodiments of separation devices 9 have in general been known to those skilled in the art.

In the preferred embodiment depicted in FIG. 1 of the method according to the invention the material powder having the second particle size range is conveyed out of the separation device 9 into two further separation devices 9. According to the invention the material powder having the second particle size range is conveyed out of the separation device 9 into at least one further separation device 9. In the at least one further separation device 9 the material powder having the second particle size range is separated into material powder having at least two further particle size ranges. Subsequently, the material powder having at least one of the at least two further particle size ranges is removed from the conveyor gas 7. In this way, there is obtained the advantage that the material powder may be split into various particle size ranges. The further separation devices 9 may be configured like the separation device 9, or they may apply an alternative separation method.

The separation device 9 is, for example, configured as a cyclone separator, wherein there is provided a further successive separation device 9, which is configured as a filter.

Alternatively, there may also be used two cyclone separators in series with a successive filter. Another exemplary embodiment variant of the device according to the invention comprises a coarse separator, a cyclone separator and one or also two successive filters. Instead of filters, there may also be used wet separators.

As depicted in FIG. 1, the method according to the invention comprises in the preferred embodiment heating the atomization gas 6 using an atomization gas heat exchanger 10. In this way there is obtained the advantage that the temperature of the atomization gas 6 is increased, whereby there may be obtained a better atomization result.

The method according to the invention preferably comprises furthermore cooling the conveyor gas 7 using a first conveyor gas heat exchanger 11. The first conveyor gas heat exchanger 11 cools the conveyor gas 7 preferably before the compression thereof using the conveyor gas compressor 1. In this way, there is prevented overheating of the conveyor gas in the conveyor gas compressor 1.

In the preferred embodiment of the method according to the invention there is further provided a second conveyor gas heat exchanger 12, which cools the conveyor gas 7. In this way there is obtained the advantage that overheating of the conveyor gas 7 or of individual components of the method, respectively, of a device 20 according to the invention, respectively, which performs the method according to the invention, is prevented.

The device 20 according to the invention, which is depicted in FIG. 1, for producing material powder comprises the conveyor gas compressor 1, the atomization gas compressor 2, the atomization device 3 and the pressurized container 4. The device 20 according to the invention preferably comprises the at least one separation device 9 for separating the material powder into various particle size ranges. In the preferred embodiment of the device 20 according to the invention the device 20 further comprises the cooling device, the atomization gas heat exchanger 10, the first conveyor gas heat exchanger 11 and the second conveyor gas heat exchanger 12.

Figure 2A:
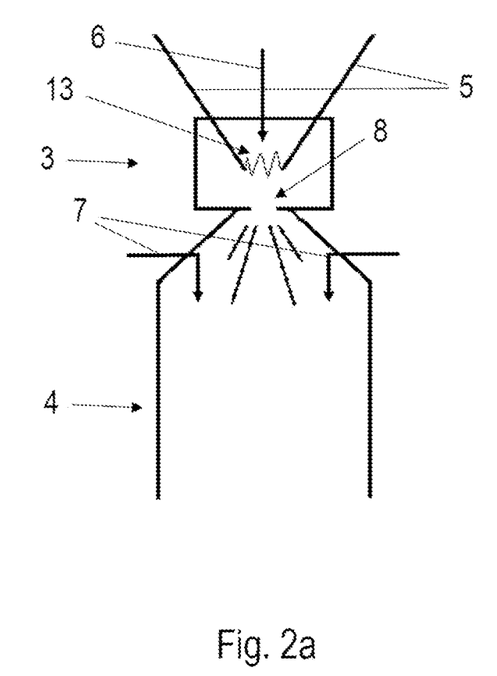
FIG. 2a shows an atomization device of the device according to the invention in a first embodiment variant.

FIG. 2a shows a first embodiment variant of the atomization device 3 of the device 20 according to the invention. The atomization device 3 is configured in the first embodiment variant as a plasma atomization device, preferably for metal. The material 5 is introduced in the form of metal wires into the atomization device 3, wherein melting the material 5 is carried out by applying an electrical voltage onto the metal wires by means of a light arc 13. This results in a change of the distance of the ends of the metal wires by a continuous melting thereof, which is compensated by a constant advance of the wire. The light arc 13 is charged with the atomization gas 6 having the atomization gas pressure, whereby the molten material 5 is atomized into material powder. The material powder is introduced by the atomization gas 6 into the pressurized container 4, whereby the pressurized container 4 is charged with the conveyor gas 7 being lower than the conveyor gas pressure. The conveyor gas 7 is preferably, as depicted in FIG. 2, introduced in several gas streams or in parallel to the ejection of the material powder out of the atomization device 3, respectively, into the pressurized container 4. It may, however, also be introduced in a tangential inlet, or also in the radial direction to the ejection of the material powder. In this way, turbulences are prevented, whereby satellite formation of material powder is being avoided. Satellite formation in general is to be understood as the attachment of smaller particles at larger particles within the material powder. In addition, in this way there is also achieved cooling of the pressurized container 4, whereby the energy requirement of the method according to the invention or of the device 20 according to the invention, respectively, is reduced. By adjusting the atomization gas pressure and the conveyor gas pressure, a length of the light arc 13 may be influenced, whereby there is also achieved a variation of the particle size distribution and the average particle size of the material powder produced.

Figure 2B:
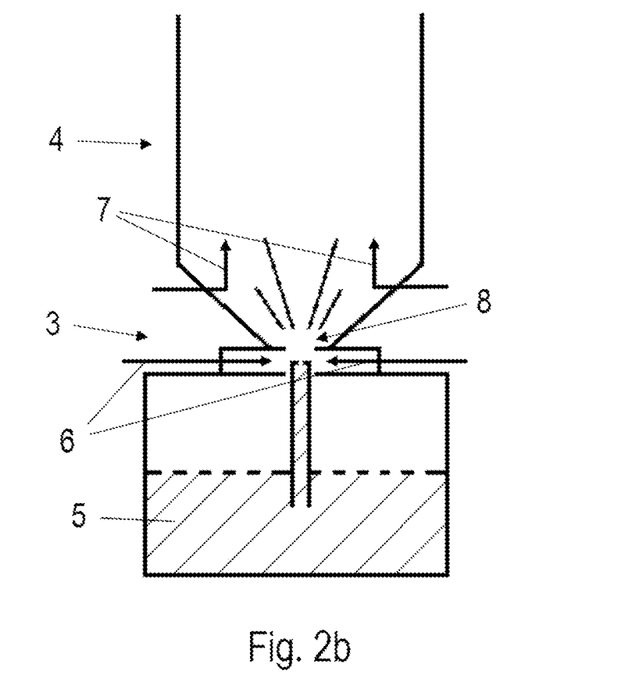
FIG. 2b shows the atomization device of the device according to the invention in a second embodiment variant.

FIG. 2b shows a second embodiment variant of the atomization device 3 of the device 20 according to the invention, wherein in this embodiment variant the material 5 is thermally molten. The material 5 may, for example, be molten by means of induction. Further melting methods are commonly known to those skilled in the art. The molten material 5 is charged in the atomization device 3 with the atomization gas 6 and atomized to material powder. The conveyor gas 7 is preferably introduced, like in the first embodiment variant of the atomization device 3, in several gas streams or in parallel, respectively, or also in the tangential or radial direction, respectively, to the ejection of the material powder out of the atomization device 3 into the pressurized container 4. In this way, again satellite formation is being avoided. Furthermore, this will result in a cooling of the pressurized container 4, whereby the energy requirement of the method according to the invention or of the device 20 according to the invention, is reduced. This atomization device 3 is suitable, apart from metals and alloys thereof, also, for example, for electrically non-conductive materials 5 such as waxes and plastics such as polymers, or also for molten mineral masses and slags. It is furthermore also possible to melt meltable, dielectric material 5 by means of a microwave generator. Further atomization methods are commonly known to those skilled in the art.

The conveyor gas pressure is preferably at least 0.5 bar above the atmospheric pressure, and may be up to 100 bar above the atmospheric pressure. The higher the conveyor gas pressure, the finer the material powder produced and the better the cooling effect. The conveyor gas pressure is preferably between 1 and 10 bar.

The atomization gas pressure is usually above the critical pressure to reach at least sonic speed in the narrowest nozzle diameter of the atomization device 3. Due to higher relative velocities between gas and molten material 5 there are produced finer material particles. Also at lower pressure ratios atomization and, hence, production of material powder is possible, in particular if it is necessary to produce coarser material powder having a narrower particle size distribution.

As atomization gas 6 and as conveyor gas 7 for the material 5 to be atomized are suitable gases known to those skilled in the art as being suitable. There may, however, also be used gas mixtures. For example, a low portion of oxygen in the otherwise inert gas (nitrogen, argon, helium or the like) may provide for the surface of the material powder being covered by an oxide layer, resulting in passivation. There are also suitable reducing gas mixtures, such as, for example, a gas proportionally containing a low amount of hydrogen. This offers the possibility to chemically reduce impurities such as oxides or the like from the particulate material. Especially advantageous is the use of reactive gas mixtures in the device 20 according to the invention or the method according to the invention, respectively. The thermodynamic equilibrium composition thereof may be adjusted via the reaction components introduced such as gases having proportional contents of $CO$, $CO_2$, $H_2O$, $H_2$, $NH_3$ etc. as a function of pressure and temperature in the stream of the conveyor gas to an oxygen residual potential that is controllable within a wide range. Such reactive gas atmospheres having an optionally exothermic or endothermic character have been known to those skilled in the art, for example, from the field of reactive oven atmospheres for metallurgical processes. In this way, with the method according to the invention oxidation, carbonization and nitration processes or alternatively oxide-free powder production methods for very oxidation-sensitive produces, such as, for example, chromium containing stainless steels, the contamination-free production thereof in common inert gas atmospheres would not be possible on the sole basis of nitrogen or argon, are made accessible. Finally, deviating from the embodiment of the method according to the invention as a cycle process, the method according to the invention may also be realized as an open method, in which various gases or gas mixtures may be used as atomization gas 6 and conveyor gas 7. In this way, for example, passivation of the material powder may only be achieved by the conveyor gas 7.

Figure 3:
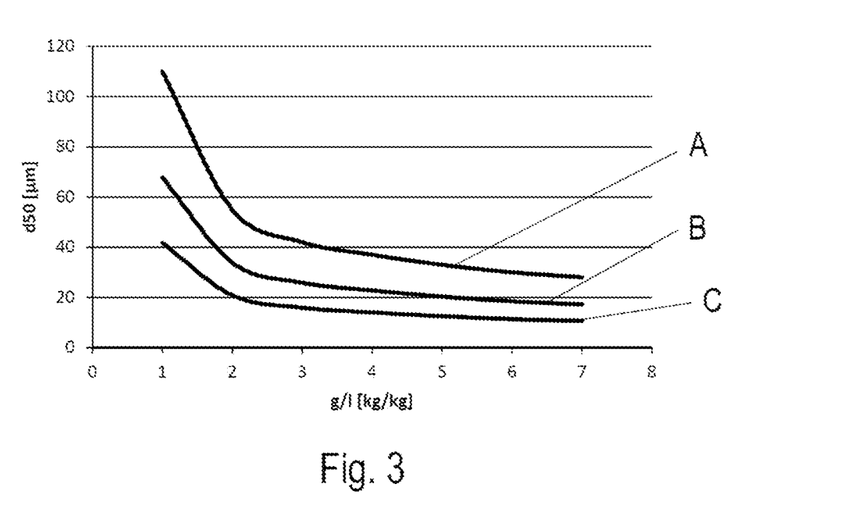
FIG. 3 shows the influence of a conveyor gas pressure on the particle size of the material powder produced using the method according to the invention.

FIG. 3 shows the influence of the conveyor gas pressure onto the particle size of the material powder by way of the exemplary production of aluminium powder by means of a crucible nozzling by the method according to the invention. FIG. 3 shows the ratio of the mean particle diameter for a given mass d50 (mass-median-diameter MMD) vs. the mass ratio of atomization gas 7 to molten material mass (M'gas/M'liq). Curve A of the diagram in FIG. 3 represents the relationship mentioned for a conveyor gas pressure of one bar, curve B for four bar and curve C for ten bar. It is obvious that an increase of the conveyor gas pressure will surprisingly lead to a reduction of the mean particle diameter of the material powder produced.

Figure 4:
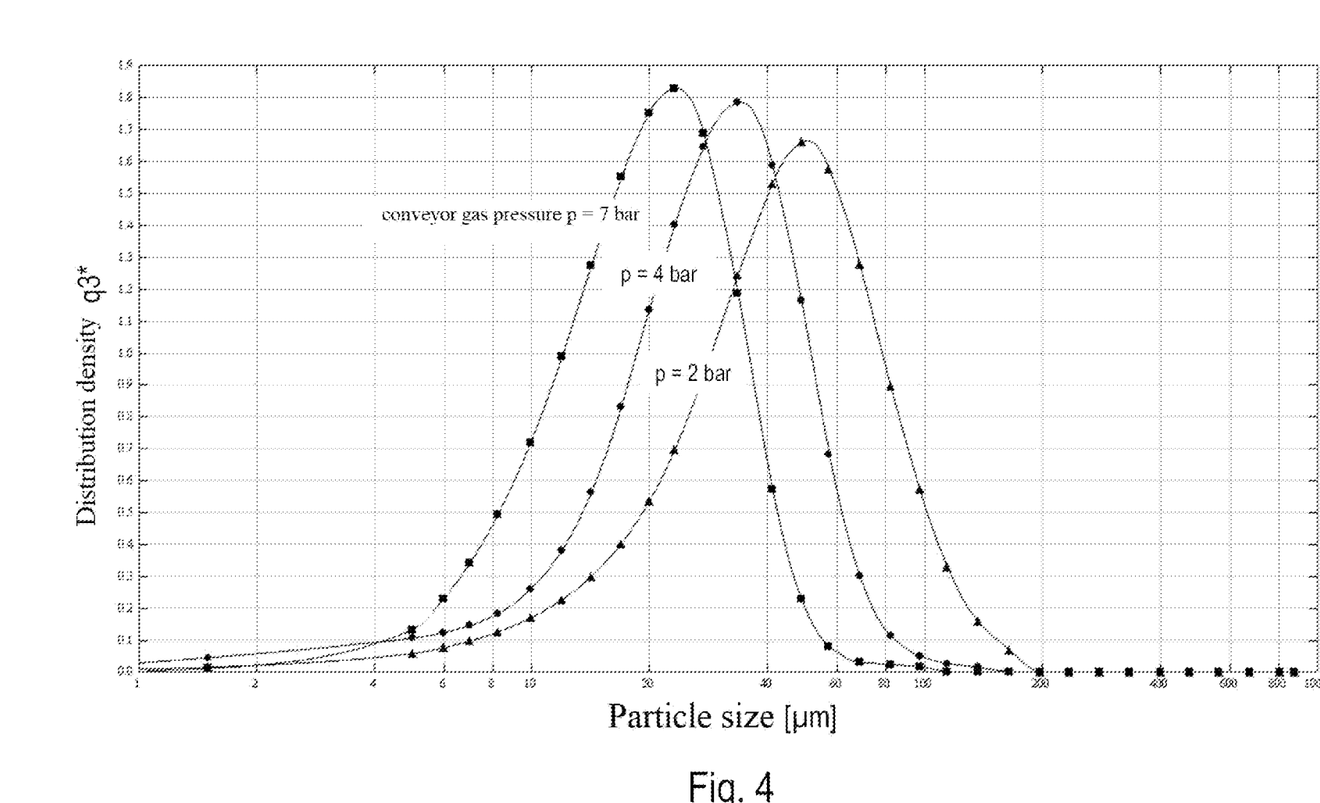
FIG. 4 shows a distribution of particle diameters of material powders produced using the method according to the invention.

The applicant has furthermore performed, using the atomization device 3 depicted in FIG. 2b according to the plasma atomization method, with the method according to the invention, experiments for determining the mean particle diameter d50 and the distribution range of the particle diameter as a function of the conveyor gas pressure. The results of these experiments are summarized as examples in table 1 and FIG. 4. The results shown in table 1 were obtained using copper as material 5:

TABLE 1

| Conveyor gas pressure p [bar] | Mean particle diameter d50 [μm] | Distribution range (d90 − d10)/d50 |
| --- | --- | --- |
| 7 | 19.84 | 1.33 |
| 4 | 28.61 | 1.43 |
| 2 | 43.82 | 1.58 |

Comparable results were obtained with the method according to the invention using various steels, molybdenum and various metal alloys.

In the following there are indicated two further exemplary embodiments of the method according to the invention.

Exemplary Embodiment 1

In this exemplary embodiment of the method according to the invention 50 kg/h aluminium are molten at 750° C. Argon is selected as an atomization gas 6, which is then introduced at a rate of 150 kg/h at a temperature of 500° C. The respective pressure ratios are:
conveyor gas pressure: 3 bar
atomization gas pressure: 10 bar
Due to the supply of the atomization gas 6 and the conveyor gas 7 this results in a system pressure in the pressurized container 4 of 4 bar.

In this way, aluminium particles having a mean diameter d50.3 of smaller than 10 μm are producing, having a distribution range of d84/d50<1.6.

Exemplary Embodiment 2

Molten stainless steel is produced at a rate of 20 kg/h in a light arc 13 generated by a welding power source. The stream of atomization gas 6 is introduced into the atomization device 3 at a mass flow rate of 150 kg/h and atomizes the molten stainless steel. The light arc 13 may be reduced by the conveyor gas pressure in the pressurized container 4 or by the counter-pressure acting thereon, respectively. This leads to very homogenous atomization conditions. The atomized stainless steel particles have a mean diameter d50.3 of 22 μm and a distribution range of d84/d50=1.38.

The invention claimed is:
1. A method for producing material powder, comprising the steps of:
providing material and an atomization gas charged with an atomization pressure by means of an atomization gas compressor to an atomization device;
melting the material and pulverizing the molten material into material powder by means of charging the molten material with the atomization gas using the atomization device;
introducing the material powder from the atomization device into a pressurized container; and
providing a conveyor gas charged with a conveyor gas pressure by means of a conveyer gas compressor to the pressurized container, wherein the conveyor gas pres- sure is higher than the atmospheric pressure and lower than the atomization gas pressure.

2. A method for producing material powder according to claim 1, further comprising:
returning the conveyor gas from the pressurized container to the conveyor gas compressor.

3. A method for producing material powder according to claim 1, further comprising:
diverting a portion of the conveyor gas having the conveyor gas pressure before the provision thereof to the pressurized container and compressing the diverted portion of the conveyor gas to the atomization gas having the atomization gas pressure that is higher than the conveyor gas pressure using the atomization gas compressor.

4. A method for producing material powder according to claim 1, further comprising:
conveying the material powder from the pressurized container into a separation device by means of the conveyor gas;

separating the material powder into material powder having a first particle size range and material powder having a second particle size range using the separation device;

removing the material powder having the first particle size range from the conveyor gas.

5. A method for producing material powder according to claim 4, further comprising:

conveying the material powder having the second particle size range from the separation device into at least one further separation device using the conveyor gas, separating the material powder having the second particle size range into material powder having at least two further particle size ranges using the at least one further separation device;

removing the material powder having at least one of the at least two further particle size ranges from the conveyor gas.

6. A method for producing material powder according to claim 1, further comprising:

heating the atomization gas using an atomization gas heat exchanger.

7. A method for producing material powder according to claim 1, further comprising:

cooling the conveyor gas using a second conveyor gas heat exchanger.

* * * * *